3,515,976
SWITCHGEAR STRUCTURE FOR HIGH
D.C. VOLTAGES
Jérôme Huret and Michel Chevalier, Paris, and Raymond
Rocherolles, Sceaux, France, assignors to Compagnie
Generale d'Electricite, Paris, France, a French corporation
Filed June 10, 1968, Ser. No. 735,897
Claims priority, application France, June 9, 1967,
109,889; June 23, 1967, 111,776
Int. Cl. H02m 7/00; H02j 7/00
U.S. Cl. 321—8                                9 Claims

ABSTRACT OF THE DISCLOSURE

HT power supply apparatus contained in a first conducting enclosure and a load apparatus to be supplied in a second conducting enclosure, both enclosures being joined together at the top by means of a tube containing a resistor of a unique design which electrically connects the load apparatus to the power supply.

---

Figure 1:
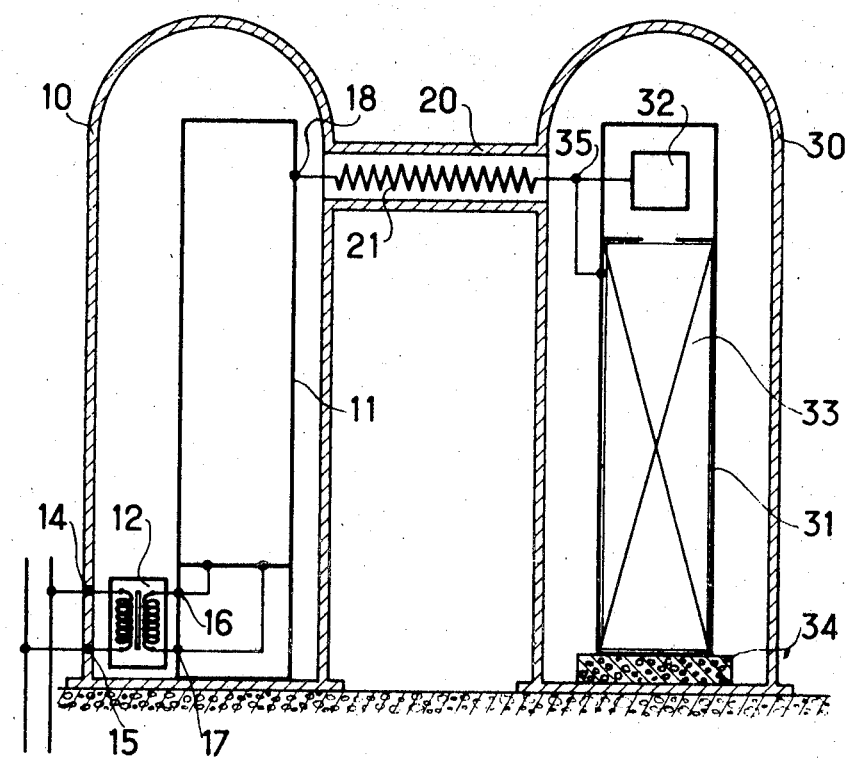

The invention relates to a switchgear structure for very high D.C. voltages, for example in excess of one million volts. It comprises on the one hand, a feed or supply unit, which supplies the unidirectional voltage from A.C. mains, and on the other hand a load which consumes the power at very high D.C. voltage. The particular installation meets particularly stringent conditions as to safety and performance.

It is known to construct such installations in the form of pillars with the supply unit consisting of at least one pillar (in fact there are generally three in the feed system) comprising at ground level a transformer connected to an A.C. supply system which supplies to the secondary winding a voltage of several tens of thousands of volts, and a succession of vertically banked stages, generally consisting of combinations of rectifiers and capacitors. These supply a unidirectional voltage which rises in arithmetical or substantially arithmetical ratio, from one stage to the other. The load is fed at its highest point, at a level substantially equal to that of the feed system, the potential falling back to zero at ground level.

Such installations are disposed in an equipotential metallic enclosure. Of course, the distance between the wall of the enclosure and the switchgear, more particularly those points of the switchgear which are at the highest unidirectional potential, must be sufficient to prevent any disruptive breakdown. Since the breakdown voltages increase substantially as the logarithm of the distance, it follows that, while the protective enclosure dimensions obtained for voltages of the order of 1 to 1.5 mv. are still acceptable, the dimensions increase disproportionally if the voltage exceeds 2 mv. and reaches, for example, 3 mv.

In order to obtain practicable enclosure dimensions, it has been found necessary to fill the enclosure with a fluid of high dielectric strength, for example a gas such as sulphur hexafluoride $SF_6$.

However, on the "other side of the picture" there is a considerable increase in the disturbing effects due to the capacitance between the switchgear and the enclosure, because the permittivity of known gasses, like that of air, is in the neighbourhood of that of a vacuum. It is therefore inevitable that the reduction of distance permitted by the use of sulphur hexafluoride results in capacitive couplings which are greater in proportion with the impedance involved, which increases in proportion as the voltages rise (since in such installations the currents do not generally exceed several hundred microamperes). The effect of the capacitances is thus increasingly harmful.

On the other hand, some applications of a very high unidirectional voltage require very strict precautions for the protection of the switchgear. This is the case with a very high-voltages electron microscope whose resolving power is directly related to the stability and the "smoothing" of the unidirectional voltage and to the state of the surface of the electrodes. Moreover, such an apparatus, which is very complex and costly, must be completely protected against local overvoltages which might impair the surface state of the electrodes by sparking, and against overcurrents which might create permanent local "micromagnetisations." Such protection may be afforded by a resistance connected between the "hot point" of the unidirectional feeder and the hot point of the load, and in fact between their high points. If a short-circuit or a breakdown in the load occurs, the immediate result is that, owing to the incipient overcurrent which is set up, a sudden voltage drop occurs across the resistance, which prevents the overcurrent from completely developing and having harmful effects. For example, a resistance of 200,-000Ω, which presents a voltage drop of 60 volts for a current of 300 μa., absorbs 3 mv. for a current of 15 a. This is therefore an asymptotic limit value and in fact the peak current in such a case is limited to a much lower value, for a correct operation of the resistance, while the overcurrent would reach a very high and destructive level without the protection of the resistance.

Such a resistance also performs a function in the smoothing of the rectified current in that it constitutes a low-pass filter of the "RC" type with the capacitances of the installation, whether they be parasitic capacitances or condensers.

However, such a resistance can only appropriately perform its function in the absence of direct coupling between the feed unit and the load unit. Now, the foregoing description shows that, with constructions of known type, for a very high-voltage switchgear operating in a gas such as sulphur hexafluoride, such a coupling is unavoidable. Under these conditions, it becomes impossible for intense and sudden currents to produce, the protective resistance, a sufficiently rapid current increase for the protection to have its full effect. A direct transfer of charges by the parasitic capacitances will occur for a fraction of a microsecond and, before the resistance develops its internal voltage drop, the switchgear will be seriously damaged.

Likewise, its operation as an RC filter is disturbed by the existence of a direct coupling between the ends of the resistance.

This is why, in accordance with the invention, a switchgear for very high unidirectional voltages, comprising a supply unit and a load unit, which are interconnected by a resistance, is in the form of two separate tanks connected by a duct in which the resistance is disposed, the said duct forming a continuous assembly with the two tanks.

In the general case, in which the supply unit is in the form of a pillar, the load is also in the form of a pillar and the assembly thus takes a "π" form. However, within the scope of the invention, the switchgear may be of more complex form. More particularly, the load may have a form which departs appreciably from that of a pillar, while being contained in one tank, and the feed unit being contained in another tank.

The construction in the form of two tanks is more complex, takes up more space and is more costly than construction in a single enclosure, but it affords a valuable advantage in respect of protection and safety.

This type of construction affords a further advantage in the field of normal operation because, as has been indicated in the foregoing, by eliminating or greatly attenuating the couplings between the ends of the interconnecting resistance, the RC smoothing filter is fully effective.

Moreover, the construction involving tanks affords a further very important advantage, because in a single enclosure it is very difficult to avoid direct radiation of the alternating-current field which exists around the feed unit on to the load. A very effective smoothing of the current does not entirely protect the load from components received by radiation. Such a disturbance is harmful in some cases in which the absence of any undulatory field is vital in the load. This is the case, more particularly, with an electron microscope, the resolving power of which is compromised by the least undulation in the speed of the accelerated electrons.

On the other hand, in a two-tank construction, the duct serving as a casing for the interconnecting resistance can readily be given dimensions such that it constitutes in fact, a "wave guide" operating under the cut-off conditions for the alternating field generated by the feed unit. There is thus obtained a substantially infinite attenuation of all the alternating components which are set up in the high-voltage feed unit.

The resistance has two functions. On the other hand, it performs the function of an RC type filter in cooperation with parasitic capacitances, or condensers added to the installation, in order to "smooth" the rectified current supplied by the feed unit. On the other hand, it performs a protective function by limiting to a safe value, an overcurrent which may be set up in the installation owing to an accidental short-circuit or a breakdown.

In this case, there is set up, at that end of the resistance which is opposite to that part of the installation in which he short-circuit has occurred, a steep-fronted potential wave. Since it is important that this wave should be uniformly distributed over the whole resistance as rapidly as possible and should generate therein a current which very quickly assumes the same value throughout the length of the resistance, it is advantageous for this resistance to be shunted by capacitances. It is known in such a case to form a protective resistance of capacitive type by connecting condensers in parallel with the resistance.

In some cases, and more particularly in installations operating at millions of volts for which strict protective guarantees are required, it is essential to ensure maximum uniformity of distribution of the sudden potential variations occurring along this resistance in the event of a short-circuit.

In order to enable the resistance to perform effectively its protective function and, to start with, to protect the resistance itself against destruction, it is important that each element of the resistance (the latter may have a lengh of several metres) should at all times be protected from the electric field resulting from the existence of the wall of the opposite duct.

This is achieved by providing, at preferably regular intervals, circular shields in the form of flat rings surrounding the resistance, perpendicularly to its axis, each of which comprises, on its external periphery, a first toroidal boss and on its internal periphery a second toroidal boss, the ratio between the internal diameter of the duct and the overall diameter of a shield being in the neighbourhood of $e$, which is the base of the Mapierian logarithms.

For a switchgear having high-quality operating characteristics, the two-tank construction according to the invention therefore affords a number of very valuable advantages over the known construction.

Figure 2:
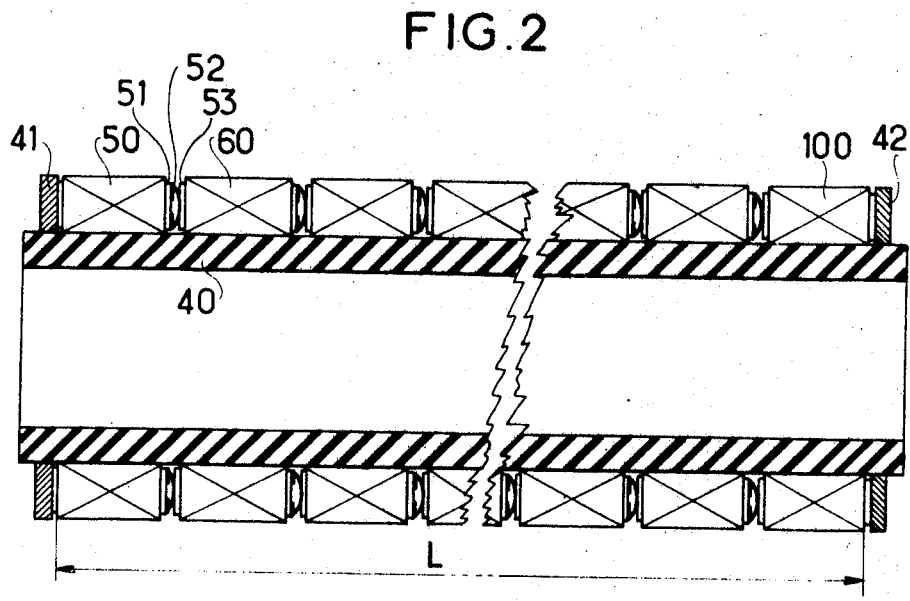
Figure 3:
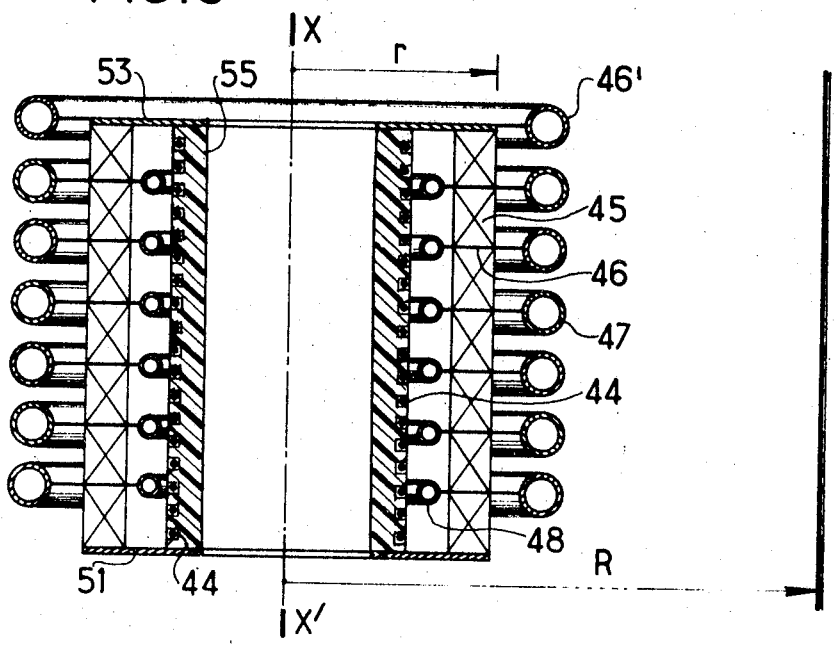
Figure 4:
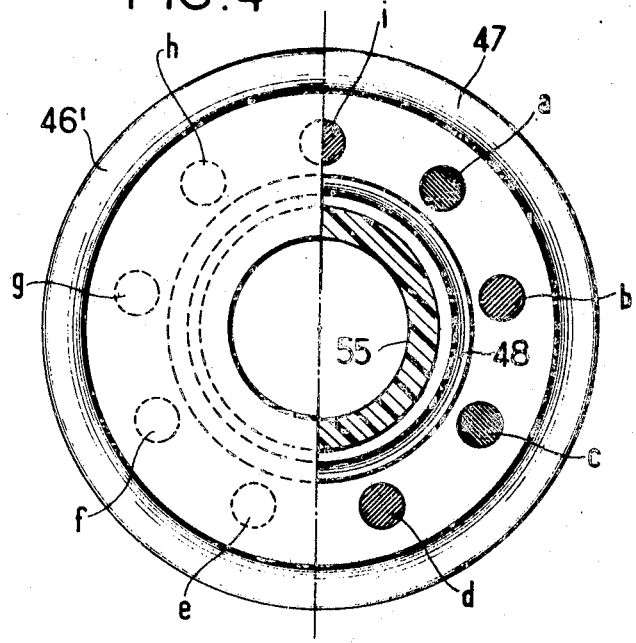

The invention will be illustrated by means of an embodiment described with reference to the accompanying drawings, in which:

FIG. 1 is a sectional view of a two-tank installation according to the invention, FIG. 2 is a diagrammatic sectional view, to a large scale, of a connecting resistance between the aforesaid two tanks, FIG. 3 is a sectional view of a portion of the resistance of FIG. 2, FIG. 4 is a partial sectional end view of the element of FIG. 3.

In FIG. 1, a high-voltage switchgear is contained in two separate tanks 10, 30 connected at their upper parts by a duct 20. The whole structure consists of metal, for example stainless steel. The assembly rests on the ground.

The tank 10 contains a feed or supply installation 11 of known type consisting of a stack of stages containing rectifiers and condensers. This installation is fed from A.C. supply mains by a transformer 12 whose primary winding is connected by terminals 14, 15 to the A.C. mains, while the secondary winding is connected by insulated terminals 16, 17 to the input of the feed installation.

The tank 30 contains a load apparatus 31 fed with the high voltage, which may be, for example, an electron microscope. The high voltage, which is negative, in this case, is applied to an electron gun 32 by a terminal 35. A set of accelerating and focusing anodes constitutes the part 33 of the load, which is also connected to the terminal 35. The objects to be observed are disposed in the region 34.

A connecting resistance 21 connects the high-potential point 18 of the feed installation 11 to the electron gun 32. This impedance has been shown in the form of a resistance. Generally speaking, it is a resistance combined with capacitance.

The whole assembly may be filled with a fluid of high dielectric strength, for example a gas such as $SF_6$.

The two main elements 11 and 31 of the switchgear have been illustrated in the form of pillars. This is the commonest form, but it is not the only one. The load may be in more complex form.

In FIG. 2, it is seen that the resistance, which has a total length $L(L=4.20$ metres in a defined construction), comprises a number of identical segments denoted by 50, 60 ... 100.

With, for example, ten segments of a unit value of 20,000 ohms, there is obtained a value of 200KΩ for the total resistance.

A resistance segment such as 50 terminates, at one end, by a metal plate 51 and at the other end by a plate 53. The ten segments mounted on an insulating tube 40 are gripped together by two end collars 41 and 42 of known construction. Each plate is electrically connected to the elementary resistance. The electrical connection of one segment to the other is effected by a flat spring such as 52, compressed between the plate 51 of the element 50 and the plate 53 of the adjacent element 60, this structure being repetitive.

FIGS. 3 and 4 show on a larger scale a segment such as the segment 50 of FIG. 1. It comprises an insulating tube 55 of axis X–X', for example of epoxy resin (registered trademark Araldite), screwthreaded, for example, with a pitch of 1 mm. on which a resistive wire 44 is coiled.

The plates 51 and 53 serve as supports for a number of pillars distributed in a circle, each of which is formed of a number of series-connected condensers, such as 45, of cylindrical external form. In order not to overload the figure, the manner in which these condensers, which are of normal commercial type, are connected is not shown in detail. The connection is effected, very simply, by screwing a screwthreaded end member (not shown) provided on each condenser into a tapped blind hole (not shown) in the adjacent condenser.

Gripped between two condensers is an annulus such as 46 external terminated by a first toroidal boss as seen in section at 47, and on the interior, opposite the coil 44, by a second toroidal boss which is shown in section at 48.

The second inner toroidal boss 48 preferably has a smaller radius than the outer toroidal boss 47.

In one embodiment, the number of series-connected condensers 45 is seven.

In the end view of FIG. 4, each column of condensers is projected on to a circle. There are nine pillars projected at $a, b, c \ldots i$.

Since each condenser 45 has a capacitance of 1250 pf., the resultant capacitance in parallel at one element is about 1600 pf.

In a coaxial cylindrical structure comprising an outer frame of given radius R and an inner frame of variable radius $r$, in a given medium, the maximum voltage that can be safely applied between the frames is obtained with a ratio $R/r=e$, $e$ being the base of the Napierian logarithms. It is obvious that if $r$ is in the neighbourhood of R, the disruptive voltage is low, owing to the closeness of the surfaces. On the other hand, if $r$ decreases greatly, there is set up around the inner frame a closeness of the equipotential surfaces which results in an increase in the field and hence in a reduction of the disruptive voltage. Theory shows that the ratio $R/r=e$ is the most favourable value.

The dimension which performs the function of the inner radius $r$ is here the radius between the axis X–X' and the end of an outer toroidal boss 46. For an internal radius R of the duct, the dimensions will be so adjusted as to obtain approximately a ratio $R/r$ of the order of 2.7, for example between 2 and 3.5, and preferably between 2.4 and 3.0.

The resistance may be the same for all the elements. For some applications, the uniform distribution of resistance is not the most advantageous one in principle, the total resistance being lower for a relatively low unit ohmic value at the ends, which increases towards the centre. On the other hand, it will be more economical to adopt a uniform unit resistance.

All the numerical values (except that of the ratio $R/r$) have been given by way of example.

What is claimed is:

1. An improved switchgear structure for high D.C. voltages of the type including a supply unit and a load unit interconnected at their upper parts by electric means, the improvement comprising: separate tanks for receiving the supply and load units, a duct coupling said tank, and carrying said resistance means and forming with said tanks, a continuous assembly.

2. The switchgear as claimed in claim 1 wherein: the dimensions of the duct are such that the duct operates as a wave guide at cutoff to prevent direct energy coupling between the supply unit and the load unit by radiation.

3. The switchgear as claimed in claim 1 wherein: the resistance means disposed within said duct is of general cylindrical form, and comprises: an insulating support tube, a plurality of elementary resistances carried by said support tube in series abutting fashion, and resilient contact means interposed between the individual elementary resistances to electrically connect the same.

4. The switchgear structure as claimed in claim 3 further including: a pair of end plates carried by said support tube and acting to sandwich the series of elementary resistances and the resilient contacts there between.

5. The switchgear structure as claimed in claim 4 wherein said resistance means further comprises; a plurality of pillar type tubular condensers disposed between the end plates of said insulating support tube, and parallel to the axis thereof, the pillar type condensers being uniformly distributed in a circumferential array about the assembly of elementary resistances.

6. The switchgear structure as claimed in claim 5 wherein said resistance means further comprises; a metallic annulus separating the adjacent condenser with each metallic annulus including inner and outer toroidal bosses in concentric fashion.

7. The switchgear structure as claimed in claim 6 wherein said outer toroidal boss is larger than the inner toroidal boss.

8. The switchgear structure as claimed in claim 3 wherein the ratio between the inner diameter of the duct and the overall diameter of the resistance means including the array of tubular condensers is approximately equal to the base $e$ of the Napierian logarithms.

9. The switchgear structure as claimed in claim 6 wherein the ratio between the radius of the duct carrying the electrical resistance means and the radius to the end of the outer toroidal boss is between 3 and 3.5.

References Cited

UNITED STATES PATENTS

| 2,038,553 | 4/1936 | Dubilier | 307—150 |
| 2,549,995 | 4/1951 | Van Dorsten | 307—150 XR |
| 2,588,777 | 3/1952 | Thompson | 321—15 |
| 2,985,812 | 5/1961 | Peterson | 321—15 |
| 3,225,258 | 12/1965 | Brekoo et al. | |

FOREIGN PATENTS 761,886  11/1956  Great Britain.

WILLIAM M. SHOOP, JR., Primary Examiner

U.S. Cl. X.R.

307—150; 313—55, 237